(12) United States Patent
Hiraoka

(10) Patent No.: US 8,805,052 B2
(45) Date of Patent: Aug. 12, 2014

(54) APPARATUS AND METHOD FOR MEASURING THREE-DIMENSIONAL SHAPE OF WOOD BLOCK

(75) Inventor: Noriyuki Hiraoka, Obu (JP)

(73) Assignee: Meinan Machinery Works, Inc., Obu-shi (JP)

( * ) Notice: Subject to any disclaimer, the term of this patent is extended or adjusted under 35 U.S.C. 154(b) by 820 days.

(21) Appl. No.: 12/588,575

(22) Filed: Oct. 20, 2009

(65) Prior Publication Data

US 2010/0111367 A1 May 6, 2010

(30) Foreign Application Priority Data

Nov. 6, 2008 (JP) ................................ 2008-285011

(51) Int. Cl.
*G06K 9/00* (2006.01)
(52) U.S. Cl.
USPC ........ 382/141; 382/294; 356/3.03; 356/237.1
(58) Field of Classification Search
USPC ....................... 382/141, 294; 356/3.03, 237.1
See application file for complete search history.

(56) References Cited

U.S. PATENT DOCUMENTS

| | | | | | |
|---|---|---|---|---|---|
| 4,397,343 | A | * | 8/1983 | Fields | 144/215.2 |
| 4,926,917 | A | * | 5/1990 | Kirbach | 144/356 |
| 5,449,030 | A | | 9/1995 | Mutsuura et al. | |
| 5,986,745 | A | * | 11/1999 | Hermary et al. | 356/3.03 |
| 6,175,652 | B1 | * | 1/2001 | Jacobson et al. | 382/216 |
| 7,275,571 | B1 | | 10/2007 | Mawatari | |
| 2004/0246473 | A1 | * | 12/2004 | Hermary et al. | 356/237.1 |

FOREIGN PATENT DOCUMENTS

| | | |
|---|---|---|
| JP | 5-113321 A | 5/1993 |
| JP | 06-293002 A | 10/1994 |
| JP | 08-327336 A | 12/1996 |
| JP | 09-257437 A | 10/1997 |
| JP | 2007-090519 A | 4/2007 |
| WO | WO2008/027150 A2 | 6/2008 |

OTHER PUBLICATIONS

Notice of Reasons for Rejection dated Aug. 30, 2012, issued for the Japanese Patent Application No. P2008-285011 and English translation thereof.

* cited by examiner

*Primary Examiner* — Jason M Repko
*Assistant Examiner* — Katrina Fujita
(74) *Attorney, Agent, or Firm* — Edwards Wildman Palmer LLP

(57) ABSTRACT

An apparatus and a method for measuring three-dimensional shape of a wood block are disclosed. A planar light beam is projected by a light emitting device against a wood block rotatably supported on its tentative spin axis in such a way that two continuous lines extending parallel to the tentative spin axis for the entire block length are illuminated on the outer peripheral surface of the block. The block with the illuminated lines is photographed at a plurality of its angular positions by a imaging device. Based on data of the photographed line images, distances between the tentative spin axis and each of the illuminated lines on the outer peripheral surface of the block are computed at a plurality of cross-sections of the block along the tentative spin axis. Distances from the tentative spin axis to the outer peripheral surface of the block, including shapes of various irregularities on the surface of the block, are measured.

11 Claims, 13 Drawing Sheets

PHOTOGRAPHED BLOCK IMAGE

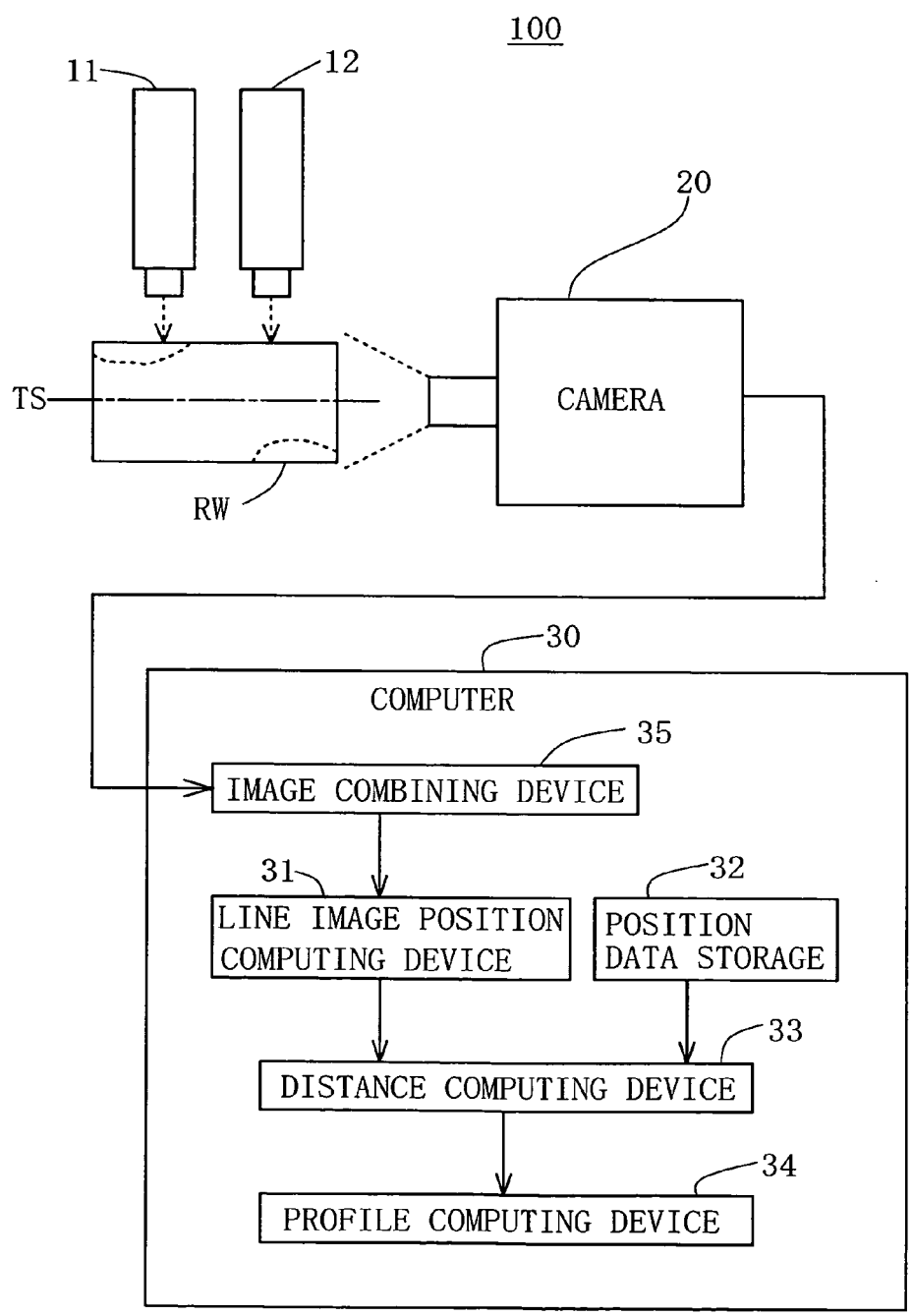

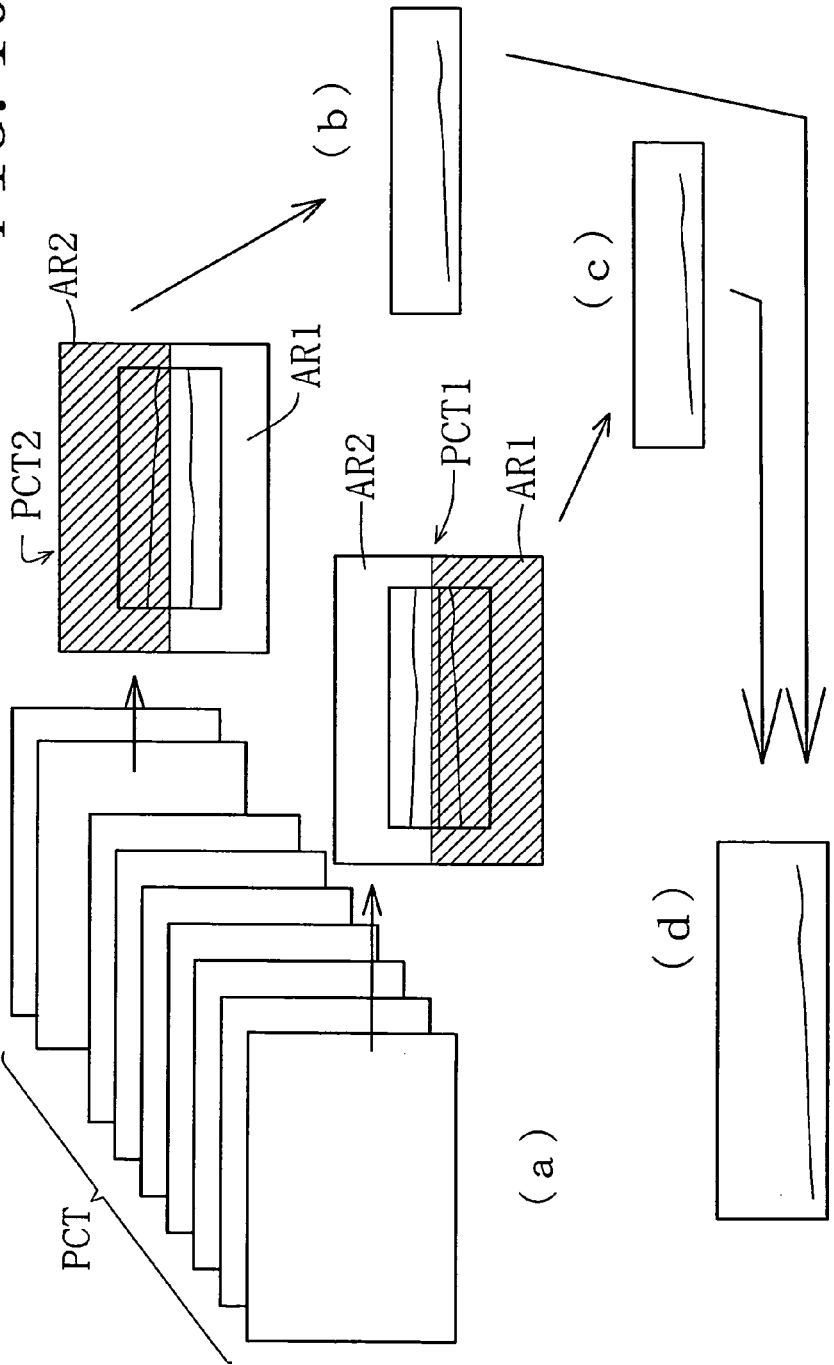

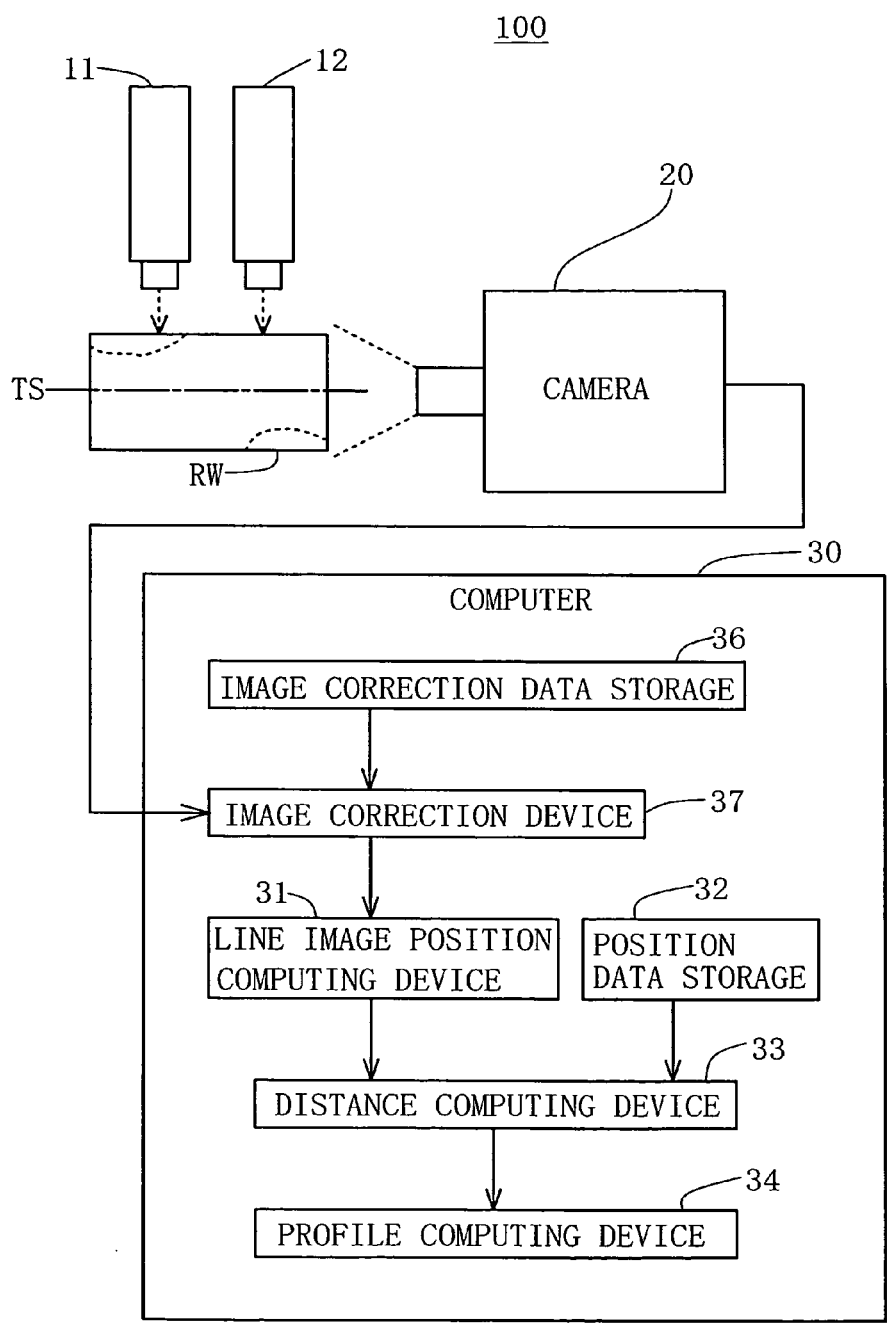

APPARATUS AND METHOD FOR MEASURING THREE-DIMENSIONAL SHAPE OF WOOD BLOCK

BACKGROUND OF THE INVENTION

The present invention relates generally to an apparatus and a method for measuring three-dimensional shape of a generally cylindrical wood block. More specifically, the invention relates to an apparatus and a method for measuring the distances of the wood block from a tentative spin axis on which the block is rotatably supported to the outer peripheral surface of the block at a plurality of angular positions thereof thereby to determine profiles of the block in a plurality of cross-sections thereof perpendicular to and spaced along the tentative spin axis of the block.

Wood veneer which is used for manufacturing various kinds of wood products such as plywood is cut or peeled from a generally cylindrical wood block by a veneer knife which is fed into the block from its peripheral surface toward the spin axis of the block. Such cutting or peeling is done by a machine called veneer lathe. In a veneer lathe, a wood block is rotatably supported by spindles having at the inner ends thereof chucks engaging with the block at the opposite ends thereof. In cutting veneer from wood block, the veneer knife is fed into the rotating block toward its spin axis for a predetermined distance for each rotation of the block thereby to peel a sheet of veneer having a predetermined thickness As is well known to those skilled in the art, a block that is made by cross-cutting a natural log to any desired length does not have a true cylindrical surface. For producing veneer from such a block with as high a yield rate as possible, three-dimensional shape of the block should be determined and known previously and the optimum spin axis on which the block is to be rotated for the best yield rate should be figured out. In initiating the peeling operation, the knife carriage of the veneer lathe carrying the veneer knife must be spaced away from the block so that no damaging interference occurs between the knife and the block when it just starts to rotate.

If the veneer knife just before being moved toward the block is spaced for a long distance from the spin axis of the block, it takes a long time accordingly before the knife engages with the block surface to start veneer peeling. The time spent before actual peeling begins is a downtime affecting the productivity of the veneer lathe. In order to minimize this downtime, the point on the block peripheral surface having the largest distance as measured from the spin axis should be located and the value of the largest distance should be figured out previously. Veneer knife on the knife carriage may be set as close to the block peripheral surface as possible based on the value of the largest distance. By so setting the veneer knife, the distance for which the knife has to move without cutting can be minimized and the working efficiency of the veneer lathe can be improved, accordingly.

Thus, the optimum spin axis and the point on the block having the largest distance between the spin axis and the outer peripheral surface of the block should be determined for improving the yield in veneer peeling and the working efficiency of the veneer lathe. For finding the optimum spin axis and the largest distance, three-dimensional shape of the wood block should be measured. Lathe charger is a machine that performs the functions of measuring the three-dimensional shape of a block, determining the supporting position of the block by the lathe spindles and also the stand-by position of the knife carriage relative to the block and then charging the veneer lathe with the peeler block.

Lather chargers that are designed to measure three-dimensional shape of a wood block using mechanical contact type sensors or non-contact type sensors such as ultrasonic sensors or laser interferometer are disclosed, for example, by Japanese Patent Application Publications Nos. H06-293002 and 2007-90519, corresponding to U.S. Pat. Nos. 5,449,030 and 7,275,571, respectively.

The lathe charger of the Publication No. H06-293002 has a plurality of contact type sensors arranged along the entire length of a wood block in close proximity to each other in facing relation to the outer peripheral surface of the block and as many displacement detectors as the sensors for measuring the displacement of their corresponding sensors. According to this lathe charger, with the sensors set in contact with the outer peripheral surface of the block, the block is rotated on a tentative spin axis for a complete turn and the amount of displacement of each sensor is measured by its displacement detector. Thus, profiles of the block in cross-section perpendicular to the tentative spin axis at a plurality of positions along the block length are determined. It is noted that the tentative spin axis is an axis which is selected tentatively and on which the block is rotated for finding the three-dimensional shape of the block and then determining an optimum spin axis of the block. The Publication also proposes an apparatus wherein the above contact type sensors are replaced by non-contact type profile detectors arranged in close proximity to each other along the length of the block.

The lathe charger according to the Publication No. 2007-90519 has a plurality of non-contact type distance detectors arranged along the length of a wood block for determining the distances from the respective distance detectors to the outer peripheral surface of the block at each of the predetermined angular positions of the block about a tentative spin axis of the block. The apparatus further has a plurality of swing arms juxtaposed along the length of the block and set in contact with the outer peripheral surface of the block and an angle detectors disposed for each swing arm for measuring the angle for which the arm has swung in accordance with the rotation of the block. The optimum spin axis on which the block should be rotated in actual veneer peeling is found based on the data of distances detected by the distance detectors, and the maximum radius point on the block is determined based on the data of angles of rotation of the swing arms detected by the angle detectors.

According to the apparatuses of the above Publications, however, the resolution in measurement of three-dimensional shape of a wood block (or profiles of the block in a plurality of sections across the tentative spin axis of the block) is poor in that the resolution is limited by the number of sensors or detector arranged along the block length. Specifically, any defective part or irregularities of a wood block such as knot, burl, hole, recess, etc. present between any two adjacent sensors or detectors cannot not be recognized.

When contact type sensors are used in measuring three-dimensional shape of a wood block having various irregularities such as projection on the peripheral surface thereof, each sensor can only detect the highest point of a projection in its detecting region without determining accurately the profile of the other parts than the highest point. In the apparatus using non-contact type sensors, the distances can be determined only at the positions where the sensors are provided and the distances at other positions of the block cannot be measured. Incapability of accurately measurement of three-dimensional profile of a wood block throughout its length makes it difficult to find an accurate position of the optimum spin axis of the block and a point on outer peripheral surface of the block having the largest distance from the spin axis that are necessary for improvement of yield and working efficiency in veneer peeling.

The present invention, which has been made in light of above problems in conventional apparatuses, is directed to providing an apparatus and a method for measuring accurately three-dimensional shape of a wood block or profiles of the block in sections across its tentative spin axis along the entire block length.

SUMMARY OF THE INVENTION

According to the present invention, a planar beam of light is projected by a light emitting device such as a laser against a wood block rotatably supported on its tentative spin axis so that continuous lines of light each extending parallel to the tentative spin axis and substantially for the entire length of the block are illuminated at two different positions on the outer peripheral surface of the block. The block having such illuminated lines on the outer peripheral surface thereof is photographed at a plurality of different angular positions thereof by any suitable imaging device such as a camera. Distances between the tentative spin axis and each of the illuminated lines on the outer peripheral surface of the block are computed at a plurality of cross-sections of the block perpendicular to the tentative spin axis and spaced at a predetermined interval along the tentative spin axis, based on data of positions of the illuminated line images and data of the positions of the light emitting device and the imaging device relative to the tentative spin axis of the block. The computation of distances at the plurality of cross-sections is done for each of a plurality of block images photographed by the imaging device at the plurality of angular positions of the block while it is rotated on the tentative spin axis. Then, profiles of the block are computed at the plurality of cross-sections of the block based on data of the computed distances.

According to the present invention, distances from the tentative spin axis of the block to the outer peripheral surface of the block, which define profile of the block, are measured by making use of the lines illuminated on the outer peripheral surface of the block. Since the illuminated lines formed by the light beams from the light emitting device lie on the outer peripheral surface of the block, the measurements of the distances from the tentative spin axis to the illuminated lines at a plurality of spaced points that correspond to the aforementioned plurality of cross-sections of the block represent accurate block profiles including the shapes of various defects or irregularities present on the outer peripheral surface of the block. Thus, the distances between the tentative spin axis of the block and the outer peripheral surface of the block can be measured with high accuracy. Decreasing the interval of the spaced points along the length of the block, the resolution in measuring the distances can be increased.

The present invention improves the accuracy in measuring the distances from the tentative spin axis to the outer peripheral surface of the block. Additionally, the resolution in measurement of the distance is improved. Therefore, three-dimensional shape of the block that is comprised of a large number of profiles in section of the block across its tentative spin axis can be measured with high accuracy throughout its length, with the result that optimum spin axis and the maximum radius point of the block can be located precisely, which makes possible improving the yield in veneer peeling and operating efficiency of the veneer lathe.

Features and advantages of the present invention will become more apparent to those skilled in the art from the following description of preferred embodiment of the present invention, which description is made with reference to the accompanying drawings, wherein:

BRIEF DESCRIPTION OF THE DRAWINGS

FIG. 9 is a schematic block diagram similar to FIG. 1, but showing a computer having an additional device;

FIG. 10 is a schematic diagram illustrating image combination according to the present invention;

FIG. 11 is a schematic block diagram similar to FIG. 1, but showing a computer having additional devices;

DETAILED DESCRIPTION OF THE EMBODIMENT

The following will describe the preferred embodiment of apparatus for measuring three-dimensional shape of a wood block according to the present invention while having reference to the accompanying drawings.

Figure 1:
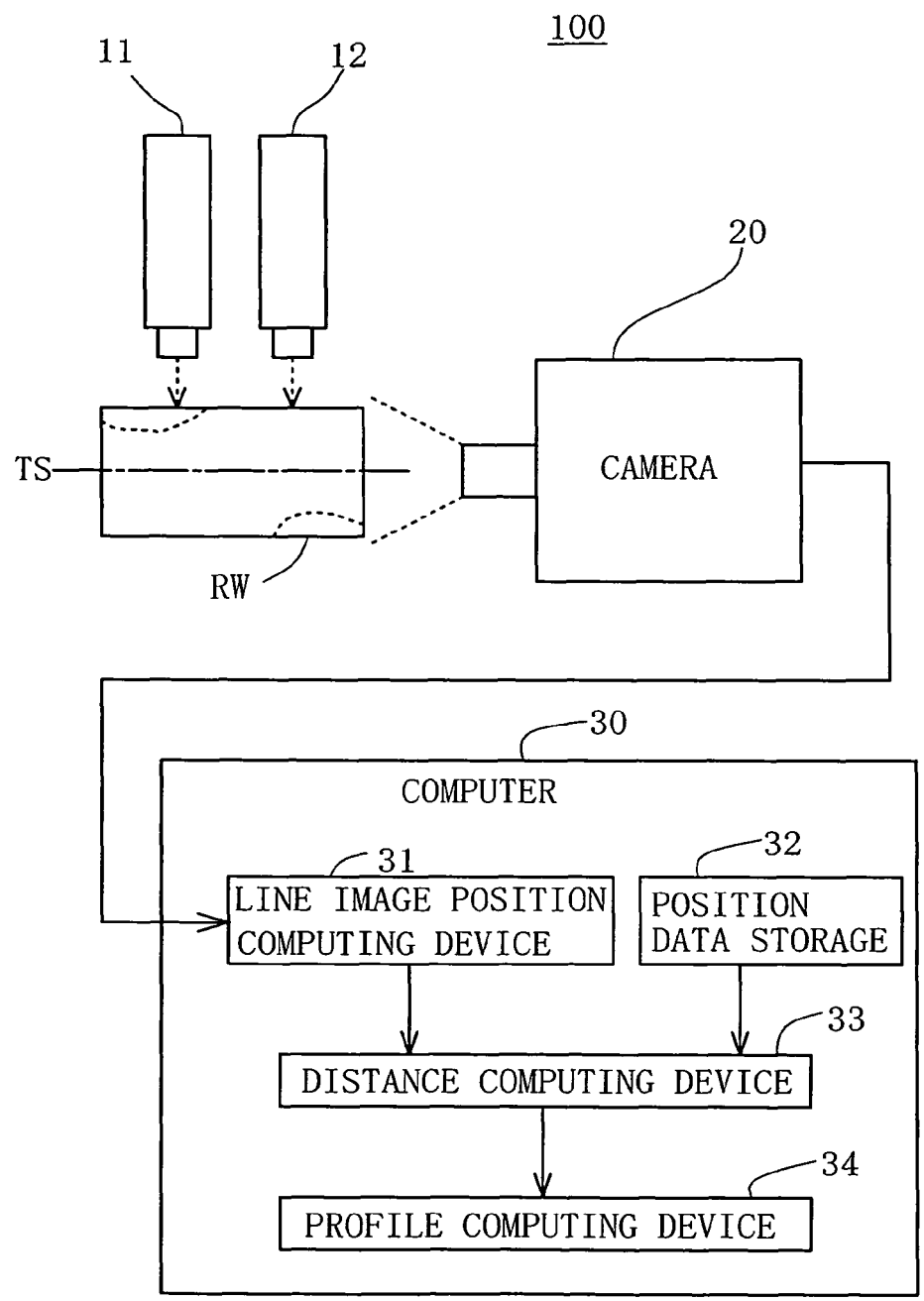
FIG. 1 is a schematic block diagram showing a preferred embodiment of an apparatus for measuring three-dimensional shape of a wood block according to the present invention.
Figure 2:
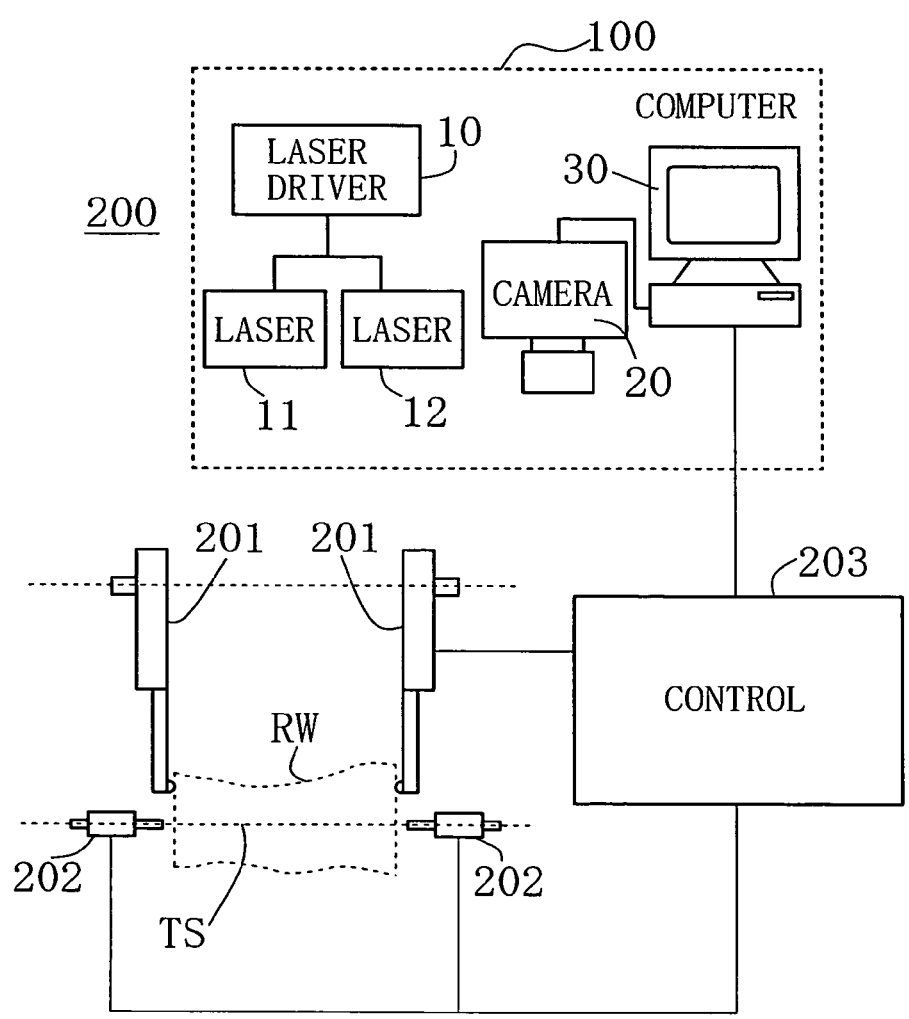
FIG. 2 is a schematic block diagram showing an example in which the three-dimensional measuring apparatus of FIG. 1 is used in a lathe charger.
Figure 4A:
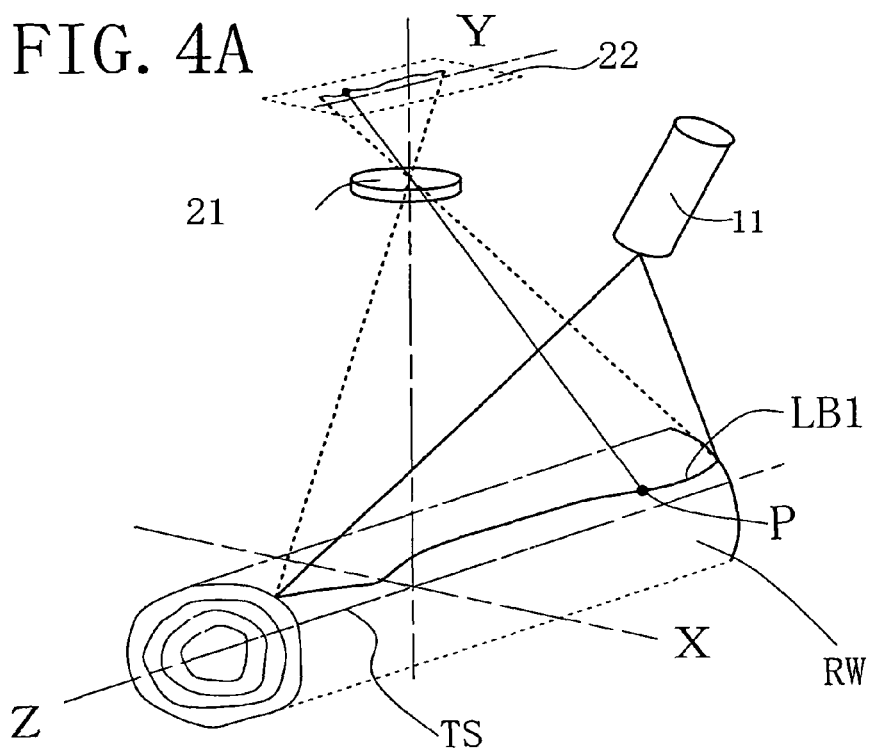
FIGS. 4A and 4B are illustrative views describing the principle of measuring three-dimensional shape of a wood block in the embodiment according to the present invention.
Figure 4B:
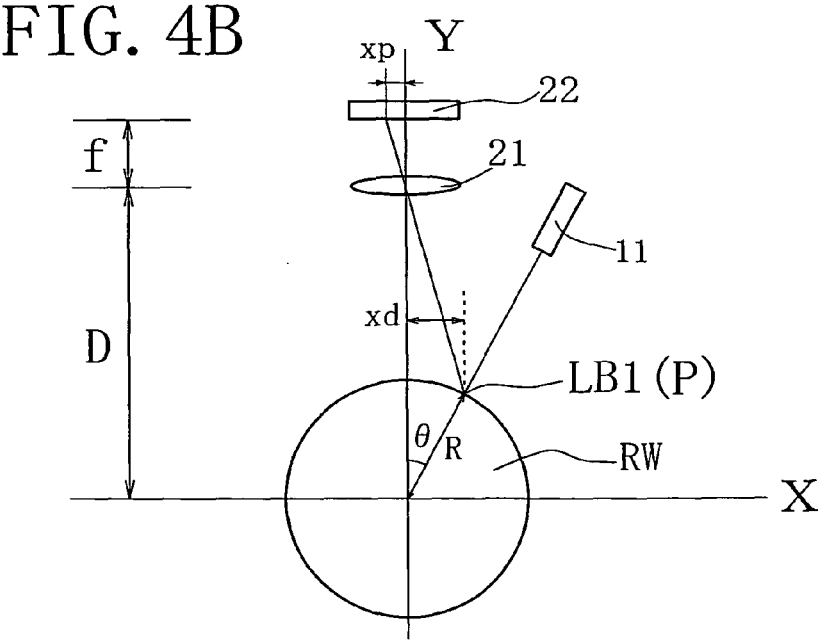

Referring firstly to FIGS. 1 and 2, the three-dimensional shape measuring apparatus, which is designated generally by numeral 100, includes a pair of lasers 11, 12 (or light emitting devices) driven by a laser driver 10, a camera 20 (or an imaging device) and a computer 30. As shown in FIGS. 4A and 4B, the camera has a lens 21 and an area sensor 22.

Referring to FIG. 2, the lathe charger, which is generally designated by numeral 200, includes a pair of swing arms 201, a pair of spindles 202 and a control 203 for controlling the operation of the swing arms 201 and the spindles 202, as well as the above three-dimensional shape measuring apparatus 100. Reference symbol RW designates a wood block that is cut from a natural log to a predetermined length. The swing arms 201 are spaced in longitudinal direction of the block RW and operable to transfer the block RW from the three-dimensional shape measuring apparatus 100 to a position between the spindles of a veneer lathe (not shown).

The spindles 202 have at the inner ends thereof chucks between which the block RW is supported at the opposite ends thereof. Specifically, the spindles 202 rotatably support the block RW at a tentative spin axis TS on which the block RW is driven to rotate. The tentative spin axis TS is an axis on which the block RW is rotated for finding the optimum spin axis of the block RW on which it should be driven to rotate in actual veneer peeling operation. The control 203 is operable to control the operation of the swing arms 201 and the spindles 202 in response to control signals transmitted from the computer 30.

Figure 3A:
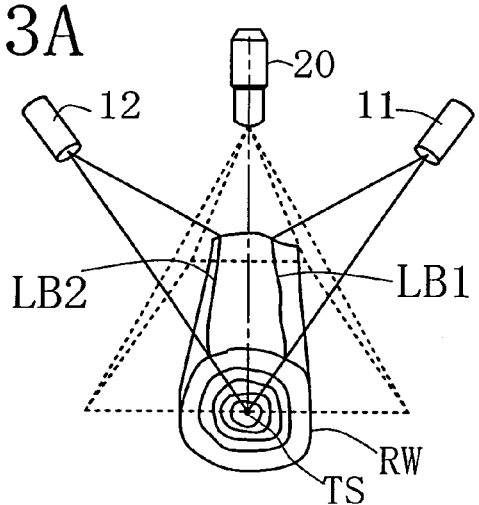
FIG. 3A is a perspective view showing an arrangement of a pair of lasers and a camera relative to a wood block.

As shown in FIG. 3A, the lasers 11, 12 emit or project planar fan-shaped beams of light from two different positions against the outer peripheral surface of the block RW, or specifically toward the tentative spin axis TS of the block RW, so that continuous lines of light each extending parallel to the tentative spin axis TS and substantially for the entire length of the block RW are illuminated on the outer peripheral surface of the block RW, as indicated by LB1 and LB2. The lasers 11, 12 may be provided by line lasers such as red semiconductor lasers. The lasers 11, 12 may be substituted by any other device that emits a planar light beam and forms an illuminated line on the outer peripheral surface of a wood block that can be photographed by the camera 20.

The camera 20 is operable to photograph the block RW having formed on the outer peripheral surface thereof two illuminated lines LB1, LB2 for a plurality of times at a predetermined interval of time during a complete turn of the block RW. That is, the camera 20 photographs the block RW at a plurality of angular positions thereof. In the present embodiment, the camera 20 takes as many as 32 images of the block RW at 32 different angular positions thereof while the block RW makes a complete turn on the tentative spin axis TS in the direction AW in one second. In this case, the camera 20 takes block images at a time interval of 1/32 second. This time interval is just an example, so that the camera 20 may take block images at a time interval that is shorter than 1/32 second for increasing the image resolution of a block profile in the block rotational direction.

Figure 3B:
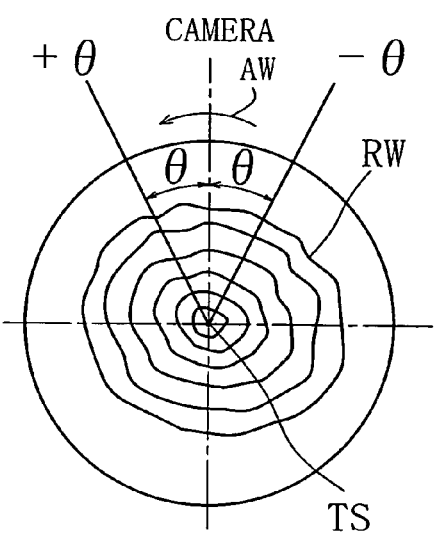
FIG. 3B shows the arrangement of the lasers and the camera as viewed from one end of the block.

Referring to FIGS. 3A and 3B, the camera 20 is disposed just above the tentative spin axis TS of the block RW at a predetermined spaced distance. Two lasers 11, 12 are located on opposite sides of the camera 20. Specifically, the lasers 11, 12 are disposed on opposite sides of an imaginary plane passing through the center of the lens 21 of the camera 20 and the tentative spin axis TS in longitudinal direction of the block as viewed from one end of the block. In the present embodiment, the lasers 11, 12 are spaced from the imaginary plane at an angle θ in opposite directions. With the position of the camera 20 located above the block tentative spin axis TS designated as 0° (or reference position), the laser 11 is disposed at an angle −θ that is upstream of the reference position, while the other laser 12 is disposed at an angle +θ that is downstream of the reference position with respect to the rotational direction AW of the block RW, as shown in FIG. 3B. It is noted that, as long as the lasers 11, 12 emit light beams that form on the outer peripheral surface of the block RW illuminated lines, such as LB1 and LB2, extending parallel to the tentative spin axis TS of the block RW substantially for the entire length of the block RW, as shown in FIG. 3A, the lasers 11, 12 may be located at any spaced distance from the tentative spin axis TS of the block RW.

Figure 3C:
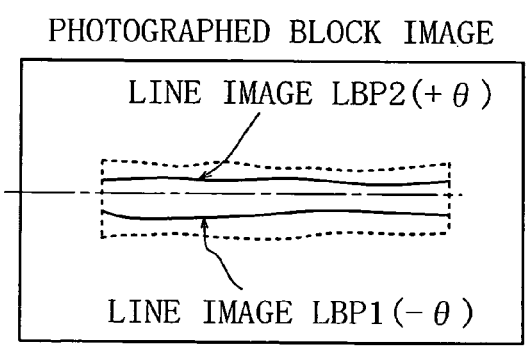
FIG. 3C shows an example of a block image photographed by the camera of FIG. 3A.

Two illuminated lines LB1, LB2 due to the light beams projected from the lasers 11, 12 against the block RW in the above arrangement of the camera 20 and the lasers 11, 12 appear at two different positions on the outer peripheral surface of the block RW, as shown in FIG. 3A. FIG. 3C shows an image of the block RW with line images LBP1, LBP2 photographed by the camera 20. LBP1 is the image of the illuminated line LB1 formed by the light beam emitted from the laser 11 disposed at angle −θ, while LBP2 is the image of the illuminated line LB2 formed by the light beam emitted from the laser 12 located at angle +θ.

Figure 5:
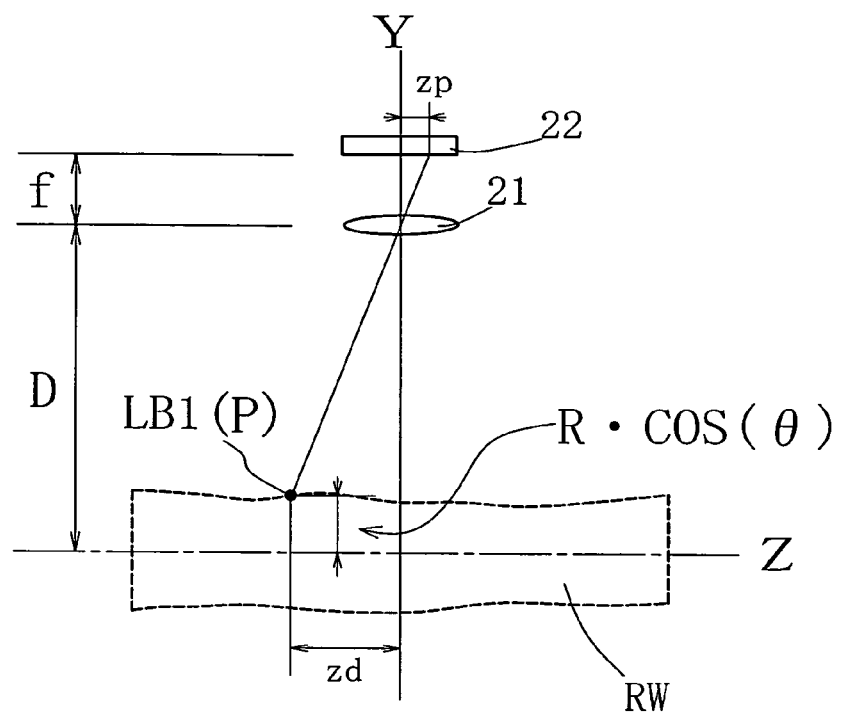
FIG. 5 is also an illustrative view describing the principle of measuring three-dimensional shape of a wood block in the embodiment according to the present invention.

Referring again to FIG. 1, the computer 30 has incorporated therein an line image position computing device 31, a position data storage 32, a distance computing device 33 and a profile computing device 34. The line image position computing device 31 is connected to the camera 20 and operable to identify or recognize the illuminated line images LBP1, LBP2 in each of the block images (FIG. 3C) photographed by the camera 20 and to determine by computation the position of each of the illuminated line images LBP1, LBP2 at a plurality of spaced points thereof that corresponds to a plurality of cross-sections of the block RW perpendicular to the tentative spin axis TS and spaced at a predetermined interval along the tentative spin axis TS, which will be described in later part hereof. Operation of the line image position computing device 31 will be described more in detail later with reference to FIGS. 4A, 4B and 5 illustrating the principle of measuring of three-dimensional shape of a wood block RW.

The position data storage 32 is a device for previously storing therein data representing the positions of the lasers 11, 12 and the camera 20 relative to the tentative spin axis TS of the block RW. In the present embodiment, the position data storage 32 stores the position data of the lasers 11, 12 and the camera 20 in terms of angles. The tentative spin axis TS is located at a known fixed position and, therefore, the distance between the tentative spin axis TS to each of the lasers 11, 12 is not necessary for three-dimensional measurement. Data about the angle of the lasers 11, 12 such as ±θ is used in measuring three-dimensional shape of the wood block RW.

The position data storage 32 stores data about the position of the camera 20 relative to the tentative spin axis TS in terms of a distance therebetween. More specifically, data D representing the distance from the tentative spin axis TS to the lens 21 of the camera 20 (FIG. 4B and FIG. 5) and data f indicative of the distance between the lens 21 and the area sensor 22 of the camera 20 (see FIG. 4B and FIG. 5) are stored in the position data storage 32. As mentioned above, the tentative spin axis TS is located at a fixed and hence known position and the camera 20 is set at the reference position)(θ=0°. Therefore, data about the distances D and f is used in measuring three-dimensional shape of the wood block RW.

The distance computing device 33 is connected to the line image position computing device 31 and the position data storage 32 in the computer 30 and operable to compute distances between the tentative spin axis TS and each of the illuminated lines LB1, LB2 on the outer peripheral surface of the block RW at a plurality of cross-sections of the block RW perpendicular to the tentative spin axis TS and spaced at a predetermined interval along the tentative spin axis TS. This can be accomplished by computation based on the light stripe method using the data of line image position computed by the line image position computing device 31 and the position data stored in the position data storage 32. The process of computing the distance according to the light stripe method will be explained in greater detail hereinafter with reference to FIGS. 4A, 4B and 5.

The profile computing device 34 is connected to the distance computing device 33 and operable to determine by computation a profile of the block RW at each of the plurality of the aforementioned spaced cross-sections of the block RW perpendicular to the tentative spin axis TS. The computation can be accomplished based on the data of a plurality of distances computed by the distance computing device 33 at the plurality of different angular positions of the block RW while it is rotated for a complete turn on its tentative spin axis TS. Thus computing the cross-sectional profiles of the block RW at the plurality of different positions on each of the illuminated lines LB1, LB2 spaced in the longitudinal direction of the block RW, an overall three-dimensional shape of the block RW is figured out.

FIGS. 4A, 4B and 5 are schematic views illustrating the principle of measuring three-dimensional shape of a wood block RW in the present embodiment. For the sake of description, the following explanation will be made using the illuminated line LB1 that is formed on the outer peripheral surface of the block RW by the light beam projected from the laser 11 disposed at −θ position. That is, a method of determining by computation the distance between the tentative spin axis TS and a point on the illuminated line LB1 in a cross-section of the block RW passing through the point perpendicularly to the tentative spin axis TS will be described below. It will be appreciated readily that the description about the measuring principle provided below using the illuminated line LB1 is also applicable to measuring the distance between the tentative spin axis TS and a point on the illuminated line LB2 that is formed on the outer peripheral surface of the block RW by the light beam projected from the laser 12 disposed at +θ position.

In FIG. 4A, the block RW, the laser 11 and the lens 21 and the area sensor 22 of the camera 20 are shown in a xyz-coordinate space, wherein the tentative spin axis TS of the wood block RW is taken as z-axis, a vertical passing through the center of the lens 21 of the camera 20 as y-axis and a horizontal passing through y-axis and z-axis at the intersection therebetween as x-axis. In this xyz-coordinate space, the camera 20 is set at such a position on y-axis that the lens 21 of the camera 20 is spaced from the tentative spin axis TS on z-axis at the aforementioned distance D, as shown in FIG. 4B. Value of the distance f between the lens 21 and the area sensor 22 is inherent to and determined by the camera 20 for use in the present embodiment. Additionally, the camera 20 is positioned such that the light receiving surface of the area sensor 22 extends parallel to xz-plane and the center of the light receiving surface lies on y-axis.

The laser 11 is disposed in xyz-coordinate space at a position that is spaced at an angle of −θ toward x-axis from y-axis. Though not shown in the drawing, the laser 12 is disposed in xyz-coordinate space at a position that is spaced at an angle of +θ toward x-axis from y-axis. Though the lasers 11, 12 are both located in xy-plane in the present embodiment, they may be located otherwise as long as illuminated lines LB1, LB2 appear on the outer peripheral surface of the block RW along its entire longitudinal dimension.

FIG. 4B shows positional relation among the block RW, the laser 11, the lens 21 and the area sensor 22 of the camera 20 in xy-plane of xyz-coordinate space. In xy-plane, the distance as measured from the tentative spin axis TS to a point P (indicated by a dot) on the illuminated line LB1 on the outer peripheral surface of the block RW in a cross-sectional plane of the block RW passing through the point P and perpendicularly to the tentative spin axis TS will be represented by R. Incidentally, the point P on the illuminated line LB1 is also indicated by a dot in FIG. 4A. Value in x-axis of the point P on the illuminated line LB1 spaced from the tentative spin axis TS at distance R in xy-plane will be represented by xd. Additionally, value in x-axis of the position on the area sensor 22 of a point in the illuminated line image LBP1 photographed by camera 20 corresponding to the above point P on the illuminated line LB1, i.e. the position of the pixel on the area sensor 22 in x-axis corresponding to the point P on the illuminated line LB1, will be represented by xp.

From trigonometric function, the following equations are formed:

$$xd/(D-R\cdot\cos(\theta))=xp/f \quad (1)$$

$$xd=R\cdot\sin(\theta) \quad (2)$$

hence, $$R=xp\cdot D/(f\cdot\sin(\theta)+xp\cdot\cos(\theta)) \quad (3)$$

Therefore, the position (R, θ) of the point P on the illuminated line LB1 in xy-plane can be figured out.

FIG. 5 shows the positional relation of the block RW, the lens 21 and the area sensor 22 of the camera 22 in yz-plane. Value in z-axis of the position of the point P on the illuminated line LB1 in yz-plane will be represented by zd. Value in z-axis of the position of the point P, i.e. the position of the pixel on the area sensor 22 in z-axis corresponding to the point P on the illuminated line LB1, will be represented by zp.

From trigonometric function, the following equation is formed:

$$zd=(zp/f)\cdot(D-R\cdot\cos(\theta)) \quad (4)$$

Substituting R in equation (4) for the value R found in equation (3), the position zd in z-axis of the point P can be figured out. Thus, three-dimensional position (R, θ, zd) of the point P on the illuminated line LB1 on the outer peripheral surface of the block RW in xyz-coordinate space can be determined.

The distance computing device 33 computes the distances R between the tentative spin axis TS and the illuminated line LB1 at a plurality of points such as P. In this case, values of the positions of zd (zd1, zd2, zd3 ... zdn: n represents the number of distance computing positions) that correspond to the aforementioned plurality of cross-sections of the block RW spaced at a predetermined interval along the tentative spin axis TS are known. Therefore, computing the distances R by the distance computing device 33, the positions of the respective points P on the illuminated line LB1 in three-dimensional xyz-coordinate space (R, θ, zd) can be determined.

As indicated earlier, the above discussion made with reference to the illuminated line LB1 and its photographed line image LBP1 is also applicable to the illuminated line LB2 and its line image LBP2.

As mentioned earlier, the distance computing device 33 computes the distances R (R1, R2, R3 ... Rn) between the tentative spin axis TS of the block RW and each of the illuminated lines LB1, LB2 on the outer peripheral surface of the block RW at a plurality of cross-sections spaced at a predetermined interval along the tentative spin axis TS. In the present embodiment, the number n of R, i.e. the number of the distance computing positions on the illuminated lines LB1, LB2, for a block RW having a length of, for example, about 3 meters, is 1200. That is, the distance computing device 33 computes as many as 1200 distances R at 1200 different positions for each of the illuminated lines LB1, LB2 in each of 32 different block images photographed by the camera 20 at 32 different angular positions of the block RW in one second. In other words, each of the illuminated lines LB1, LB2 is photographed at 32 different angular positions of the rotating block RW and the distance computing device 33 computes 1200 distances R for each of the illuminated lines LB1, LB2 in each of 32 different block images.

In the present embodiment, the value of angle θ and/or the time interval of photographing by the camera 20 are set in such a way that no part on the outer peripheral surface of the block RW is photographed twice by the camera 20, that is, any part on the outer peripheral surface of the wood block RW that has been photographed by the camera 20 as the illuminated line image LBP1 that is due to the illuminated line LB1 formed by the laser 11 will not be photographed as the illuminated line image LBP2 that is due to the illuminated line LB2 formed by the other laser 12. By so setting, 64 different illuminated lines LB1, LB2 are photographed by the camera 20 and, therefore, the distance computing device 33 computes 1200 times 64 different distances R.

Figure 6:
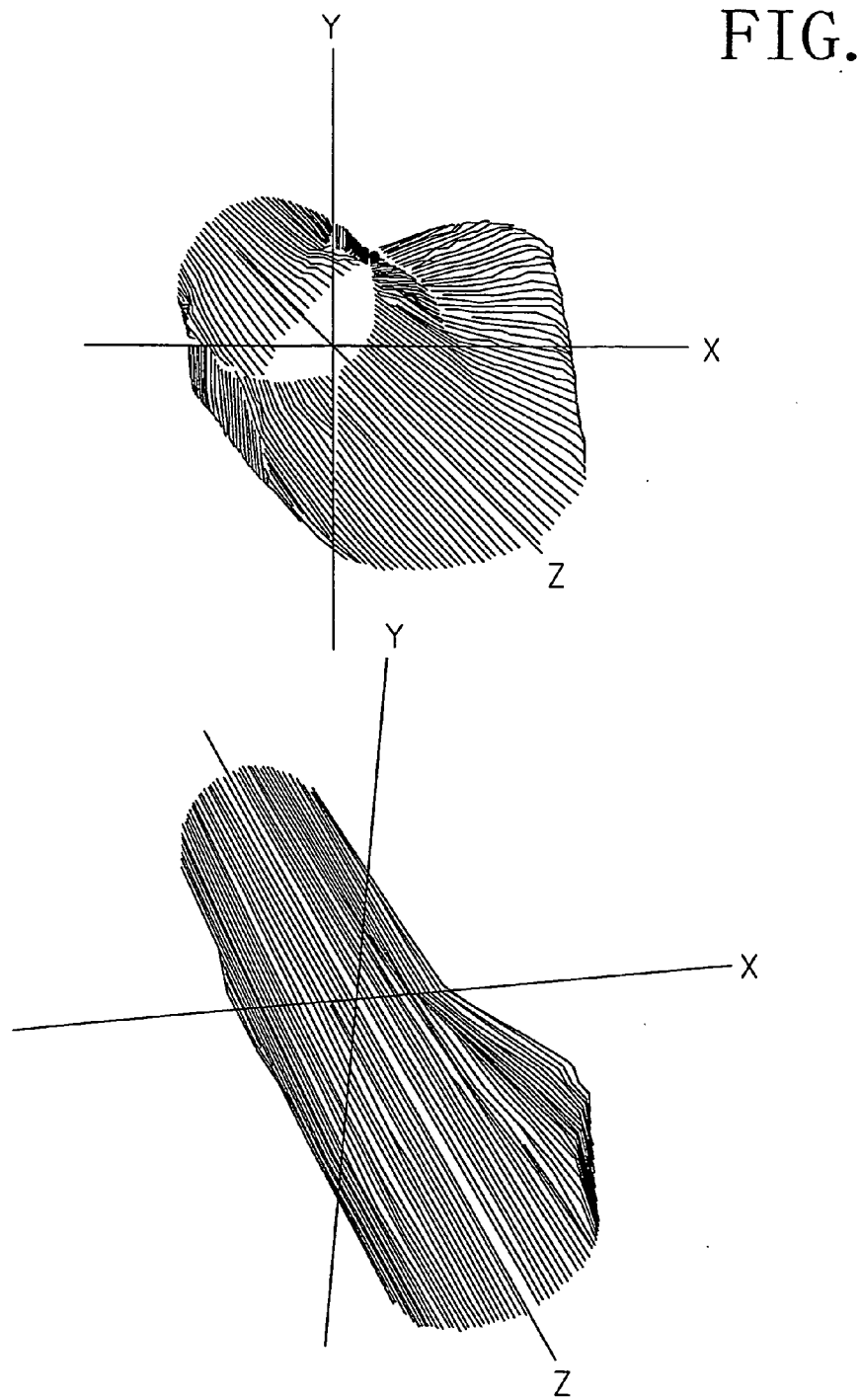
FIG. 6 shows examples of representation of three-dimensional shape a wood block measured by a profile computing device in the three-dimensional shape measuring apparatus of FIG. 1.

Based on the data of such number of distances R, the profile computing device 34 determines by computation the profile of the block RW in each of the 1200 cross-sections spaced in the longitudinal direction of the block RW. In this case, the profile of each cross-section is determined from data of 64 different distances R. Thus, a general three-dimensional shape of the block RW can be measured. FIG. 6 shows an example of representation of three-dimensional shape of the block RW measured by the profile computing device 34 and shown on a display (not shown) of the present apparatus 100. As will be appreciated from FIG. 6, three-dimensional shape of the block RW having various irregularities on the outer peripheral surface thereof can be presented with accuracy.

Figure 7:
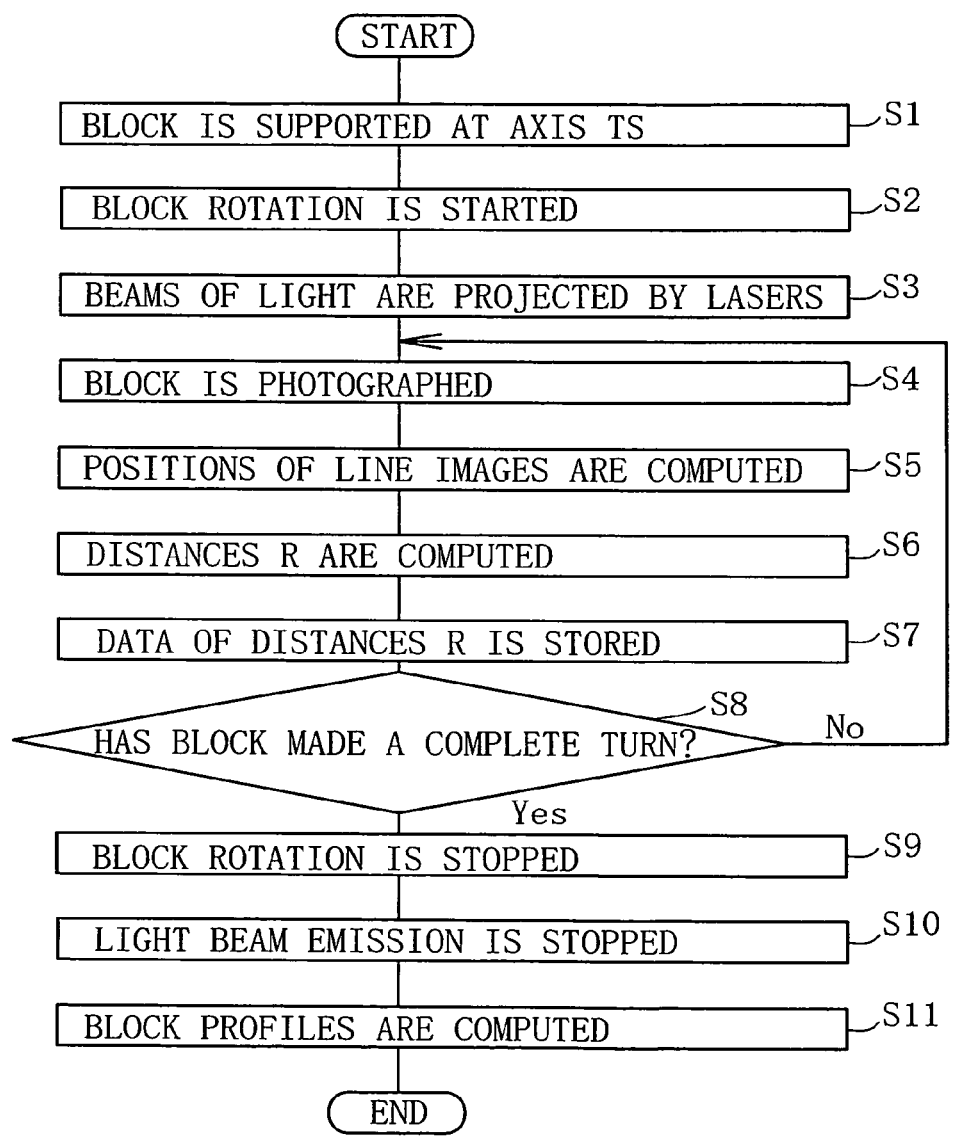
FIG. 7 is a flow chart showing an example of operation of the three-dimensional shape measuring apparatus of the embodiment according to the present invention.

The following will explain the steps of operation of the above-described three-dimensional shape measuring apparatus 100 while having reference to the flow chart of FIG. 7. Firstly, a wood block RW is transported by any suitable means such as a crane to a position between the paired spindles 202 of the lathe charger 200. The spindles 202 are then actuated to hold and rotatably support the block RW on its tentative spin axis TS with the chucks (Step 1). Then, the control 203 generates a control signal to activate the spindles 202 thereby to start rotating the block RW on its tentative spin axis TS (Step 2).

As the block RW is started to rotate, the lasers 11, 12 project planar beams of light toward the tentative spin axis TS of the block RW so that lines LB1, LB2 extending parallel to the axis TS are illuminated on the outer peripheral surface of the block RW (Step 3). The camera 20 photographs the block RW having on the surface thereof the illuminated lines LB1, LB2 so as to capture an image of the block RW (Step 4). The photographed image of the block RW is sent to the computer 30.

The line image position computing device 31 in the computer 30 firstly recognizes the illuminated line images LBP1, LBP2 in the photographed block image by using image recognition process and then determines by computation the positions of the illuminated line images LBP1, LBP2, thus providing data xp (Step 5).

Solving the equation (3) using the data of angles ±θ representing the positions of the lasers 11, 12 relative to the tentative spin axis TS, the data D and f representing the distances from the tentative spin axis TS to the lens of the camera 20 and from the lens to the area sensor of the camera 20, respectively, and also the data xp provided in Step 5, the distance computing device 33 computes the distances R between the tentative spin axis TS of the block RW and the respective 1200 points on each of the illuminated lines LB1, LB2 on the outer peripheral surface of the block RW (Step 6). Data of the computed distances R is stored temporarily in any suitable storage device (not shown) (Step 7).

The computer 30 then determines whether or not the block RW has made a complete turn on its tentative spin axis TS from the time when the first photographing by the camera 20 was done (Step 8). If No, the operation is returned to Step 4 to make the next photographing of the block RW after an elapse of a predetermined time interval subsequent to the previous photographing. Thus, steps 4 through 7 are repeated to continue computing the distances R for the photographed illuminated lines LB1, LB2. Data of such distances R is stored temporarily in the storage device (not shown).

If YES in Step 8, or when the block RW has rotated for a complete turn, the computer 30 generates a control signal to the spindles 202 to stop rotating of the block RW (Step 9). Subsequently, the lasers 11, 12 stop emitting beams of light (Step 10). Based on the data of distances R in the storage device (now shown), the profile computing device 34 computes a profile of the block RW at each of the cross-sections thereof (Step 11).

As described in detail in the foregoing, the distances R from the tentative spin axis TS of the block RW to the respective points P on the illuminated lines LB1, LB2 are measured by using the photographed line images LBP1, LBP2 for the illuminated lines LB1, LB2 formed on the outer peripheral surface of the block WR by planar beams of light emitted by the lasers 11, 12 toward the tentative spin axis TS of the block WR. Accurate measurement of the distances R is made possible when the illuminated lines LB1, LB2 lie continuously on the outer peripheral surface of the block WR. Decreasing the interval at which the distance measuring point P on the illuminated lines LB1, LB2 are spaced, the resolution of the line images LBP1, LBP2 can be increased, which may be accomplished easily through appropriate image processing by the computer 30.

In the present embodiment, two lasers 11, 12 are used to project planar beams of light against the block WR thereby to form two illuminated lines LB1, LB2 at two different positions on the outer peripheral surface of the block RW, so that the distances R may be computed from line images LBP1, LBP2 on a single photographed block image. Setting the value of angle θ and/or the time interval of photographing by the camera 20 in such a way that the time required for the block RW to rotate for the angle of 2θ and the time interval of photographing by the camera 20 are asynchronous, i.e., as indicated earlier, any part on the outer peripheral surface of the wood block RW that has been photographed by the camera 20 as the illuminated line image LBP1 will not be photographed as the illuminated line image LBP2, the resolution in measuring the distances R is doubled as compared to a case wherein only one laser is used for projecting a light beam against the block RW and the camera is operated to photograph at the same interval of time.

According to the present embodiment, the distances R are measured with an increased accuracy and, additionally, the measurement resolution of the distances R in both longitudinal and rotational directions of the block RW is improved over the background art. This contributes greatly to the improvement of accuracy in measuring three-dimensional shape (i.e. a set of a large number of cross-sectional profiles) of the block RW, with the result that useful information for locating the position of the block RW having the largest distance R is obtained and the yield in peeling a block RW into veneer and the working efficiency of veneer lathe are improved, accordingly.

It is noted that the present invention does not limit the number of lasers for use to two, such as lasers 11, 12, but any desired number m (that is more than two) of lasers may be used so that the desired number of illuminated lines LB1, LB2

... LBm are formed on the outer peripheral surface of the block RW. Obviously, increasing the number of such illuminated lines on the block RW and computing distances R for each of the illuminated lines, the measurement resolution of the distances R in rotational direction of the block RW is enhanced.

In the present embodiment, the value of angle θ and/or the time interval of photographing by the camera 20 are set so that the time required for the block RW to rotate the angle of 2θ and the time interval of photographing by the camera 20 are asynchronous. According to the present invention, however, the value of angle θ and/or the time interval of photographing by the camera 20 may be set in such a way that the time required for the block RW to rotate for the angle of 2θ and the time interval of photographing by the camera 20 are synchronous. That is, the setting may be made such that any part on the outer peripheral surface of the wood block RW that has been photographed by the camera 20 as the illuminated line image LBP1 will be photographed again then as the illuminated line image LBP2.

Figure 8A:
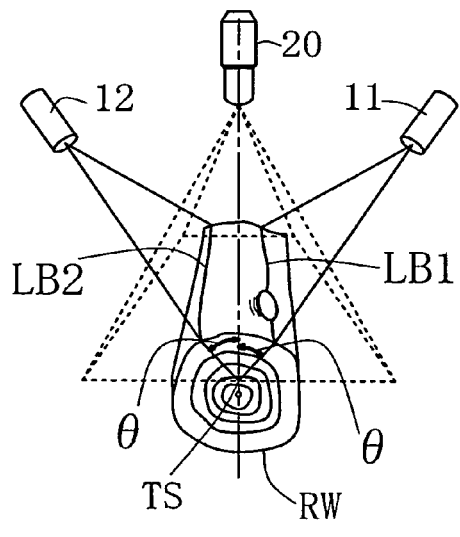
FIGS. 8A and 8B are illustrative views showing a synchronous setting of block rotation and time interval of photographing.
Figure 8B:
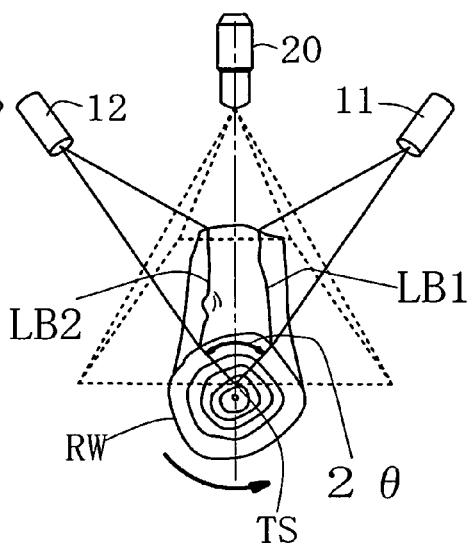
Figure 8C:
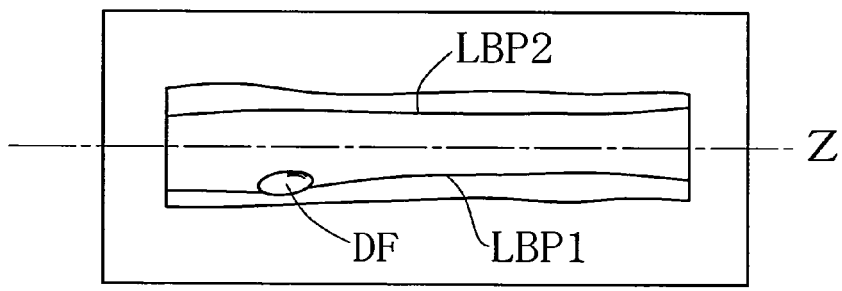
FIGS. 8C and 8D show block images photographed in the synchronous setting.

FIGS. 8A through 8D shows a case of synchronous setting and block images photographed in such synchronous setting. FIG. 8A shows a state where a block RW having on the outer peripheral surface thereof a knot or a burl DF is photographed at such an angular position that an illuminated line LB1 formed by the beam of light emitted from the laser 11 extends through the burl DF of the block RW. As shown in FIG. 8A, part of the illuminated line LB1 positioned behind the burl DF is invisible from the camera 20 and, therefore, such part of the line LB1 cannot be photographed by the camera 20. FIG. 8C shows the image of the block RW photographed in the position of FIG. 8A. As appreciated from FIG. 8C, part of the line image LBP1 is missing at the burl DF of block RW.

Figure 8D:
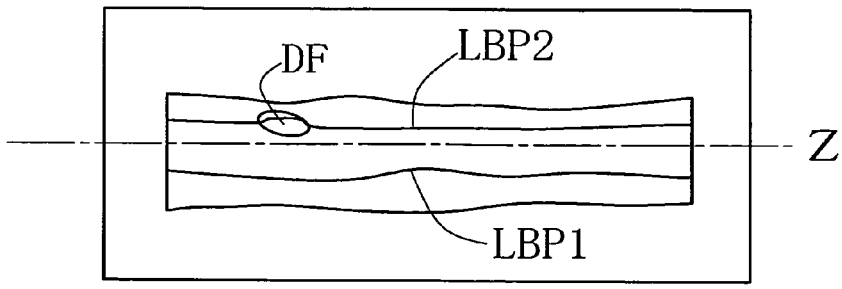

FIG. 8B shows a state where the block RW has rotated in arrow direction from the position of FIG. 8A for the angle of 2θ. As shown in FIG. 8B, the burl DF is then present in the illuminated line LB2 formed by the beam of light emitted by the laser 12. In the case of FIG. 8B, however, the illuminated line LB2 is visible from the camera 20 because the line LB2 is not then hidden by the burl DF and, therefore, the entire illuminated line LB2 can be photographed by the camera 20 successfully. FIG. 8D shows the block image with the illuminated lines images LBP1, LBP2. As shown in FIG. 8D, the line image LBP2 is photographed as a continuous line with no break due to the burl DF.

By setting the time required for the block RW to rotate for the angle of 2θ and the time interval of photographing by the camera 20 synchronously, any part on the block RW that has failed to be photographed by the camera 20 and to be included as a part of the line image LBP1 due to the presence of any irregularities on the periphery of the block RW is photographed successfully as a continuous line image LBP2. The same is true of an opposite case wherein part on the block RW that failed to be photographed by the camera 20 as a continuous line image LBP2 had been photographed successfully previously as a line image LBP1.

In the above synchronous setting, data of one of the illuminated line images LBP1, LBP2 which represents an image of a continuous line throughout the length of the block RW, or alternatively data of either one of the illuminated line images LBP1, LBP2 when both line images represent a continuous line, may be selected for use as the data for computing the distance R. In such a case, the resolution of block profile in the block rotational direction is decreased as compared to the embodiment described with reference to, e.g., FIGS. 3A through 3C. However, the decrease of resolution can be covered by shortening the photographing time interval of the camera 20.

Though the lasers 11, 12 are disposed symmetrically with respect to a vertical plane passing through the center of the lens 21 of the camera 20 and the tentative spin axis TS of the block RW as viewed from one end of the block RW, they may be arranged otherwise. For example, the laser 11 is positioned at an angle of −θ, while the other laser 12 at an angle of +α that is different form +θ. In such a case, the value of angles θ, α and/or the photographing time interval may set as required such that the time required for the block RW to rotate for the angle of (θ+α) and/or the time interval of photographing by the camera 20 are synchronous.

By so setting, a part on the block RW which has received the light beam from the laser 11 receives again the light beam from the other laser 12 when the block RW has rotated for the angle of (θ+α). Therefore, successful measurement of the distance R is accomplished even when any irregularities on the block RW prevent either one of illuminated lines LB1, LB2 from being photographed as a continuous line image as in the case which has been described with reference to FIGS. 8A through 8D.

Referring to FIG. 9 showing a modified embodiment according to the present invention, the computer 30 of the three-dimensional measurement apparatus 100 of this modified embodiment includes an image combining device 35.

The image combining device 35 is connected at the input thereof to the camera 30 and at the output thereof to the line image position computing device 31. The image combining device 35 divides each photographed block image into a first image region and a second image region along an imaginary line in the block image that corresponds to the tentative spin axis TS of the block RW. The device 35 then combines the first image region of a first block image photographed by the camera 20 at a first angular position of the block RW and the second image region of a second block image photographed by the camera 20 at a second angular position of the block RW when it has rotated for the angle of 2θ from the first angular position. This image combination is done in such a way that one of the first image region of the first block image and the second image region of the second block image is inverted in line symmetry with respect to the above imaginary line corresponding to the tentative spin axis TS and laid on the other of the first image region of the first block image and the second image region of the second block image. Image composition as used herein means that two layers having different images are combined together.

Referring to FIG. 10 illustrating the step of image combining by the image combining device 35, PCT designates a plurality of block images photographed by the camera 20 while the block RW is rotated on its tentative spin axis for a complete turn, wherein PCT1 designates the first block image photographed by the camera 20 at the first angular position of the block RW and PCT2 the second block image photographed at the second angular position of the block RW. Symbols AR1 and AR2 designate the first image region and the second image region, respectively, of the first and second block images PCT1 and PCT2.

According to the image combination by the image combining device 35, the first image region AR1 of the first block image PCT1 (shaded lower-half image of PCT1) is inverted in line symmetry with respect to the imaginary line in the first block image PCT1 corresponding to the tentative spin axis TS, as shown by the image (c), and laid on or combined with the second image region AR2 of the second block image PCT2 (shaded upper-half image of PCT2), shown also at (b).

The image resulting from such combining is shown at (d) in FIG. 10. Alternatively, the image combination may be made by inverting the second image region AR2 of the second block image PCT2 and combining the inverted image with the first image region AR1 of the first block image PCT1.

Let us suppose that the block image of FIG. 8C having an illuminated line image LBP1 that is discontinuous due to the presence of as a burl DF corresponds to the block image PCT1 in FIG. 10 and that the block image of FIG. 8D corresponds to the block image PCT2 in FIG. 10. Combining the lower half image of the block image of FIG. 8C with the upper half image of the block image of FIG. 8D, the illuminated line image LBP1 of FIG. 8C and the illuminated line image LBP2 of FIG. 8D are combine thereby to present a continuous illuminated line image having no break, as shown by the image (d) in FIG. 10.

In this modified embodiment, the line image position computing device 31 recognizes the illuminated line images generated by image combination and computes the position of the line image.

Thus, a continuous illuminated line extending the entire length of the block RW can be generated by combining two line images even when the illuminated line such as LB1 fails to be continuous due to the presence of any irregularities on the peripheral surface of the block RW. This makes possible successful measurement of profiles of a wood block at a position having irregularities that hide part of the outer peripheral surface of the block from the camera 20. Additionally, combining two image brings about an effect that is the same as doubling the laser beam intensity, which facilitates computing the position of the illuminated line images by the line image position computing device 31.

It is noted that the lens 21 of the camera 20 used to photograph the illuminated lines LB1, LB2 has its own distortion characteristic that causes a distortion in a photographed block image. Using distorted images, the distances R cannot be measured with the desired accuracy. It is desirable, therefore, that the block images photographed by the camera 20 should be corrected by compensating for the distortion before they are used for measurement of the distances R.

Referring to FIG. 11 showing a further modified embodiment of three-dimensional shape measuring apparatus 100, the computer 30 has additional devices, i.e. an image correction device 37 connected at the input thereof to the camera 20 and at the output thereof to the line image position computing device 31, and an image correction data storage 36 connected to the image correction device 37. The image correction data storage 36 previously stores therein data of correction value used for compensating for the distortion of photographed images due to the distortion of the lens 21 of the camera 20.

Figure 12:
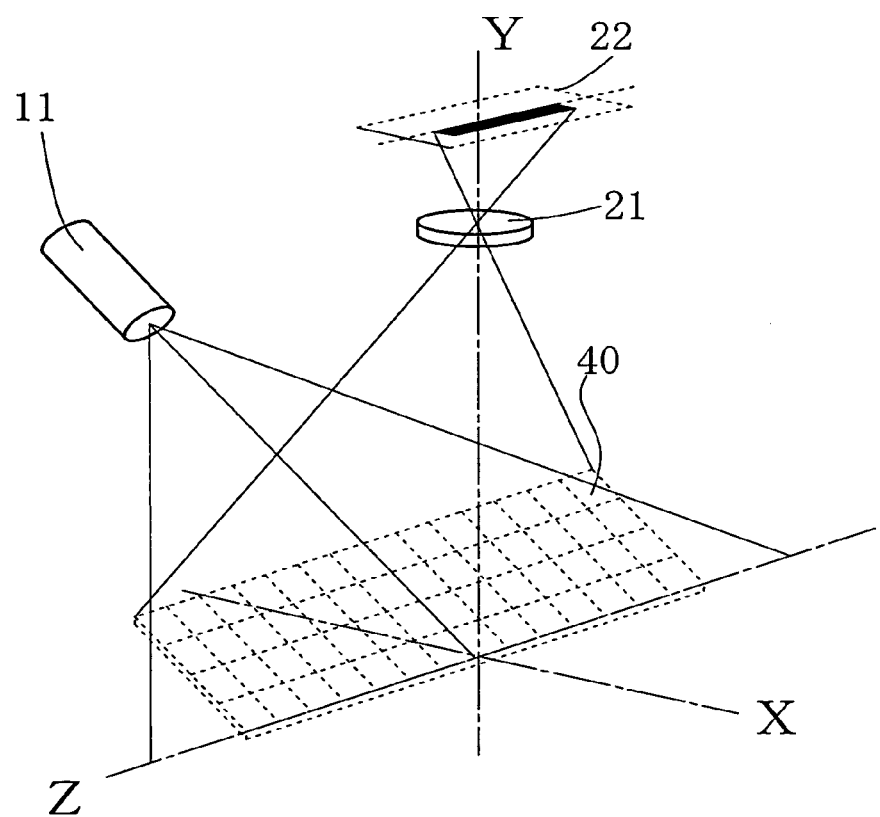
FIG. 12 is a schematic view showing an example of method for finding a distortion correction value.

FIG. 12 shows an example of a method of finding the correction value to be stored in the storage 36. Numeral 40 designates a reference gage having a plurality of lines drawn at a given spaced interval in a lattice pattern and arranged with one side thereof coinciding with z-axis. The reference gage 40 thus arranged is photographed by the camera 20. The distortion of the lens 21 of the camera 20 is reflected in the image of the lattice pattern of the reference gage 40 photographed by the camera 20. Then, any suitable image processing device (not shown) is used to figure out a value of image correction according to which distorted lines may be corrected. Data of such image correction value is stored in the storage 36.

The image correction device 37 is operable to correct the image photographed by the camera 20 in accordance with the correction value stored in the storage 36. The line image position computing device 31 recognizes the illuminated line images LBP1, LBP2 in the block image photographed by the camera 20 and corrected by the image correction device 37 and then determines by computation the position of each of the illuminated line images LBP1, LBP2 in the block image. Influence of the distortion characteristic of the lens 21 of the camera on photographed images is avoided and profiles of the block RW are computed with desired accuracy.

Figure 13:
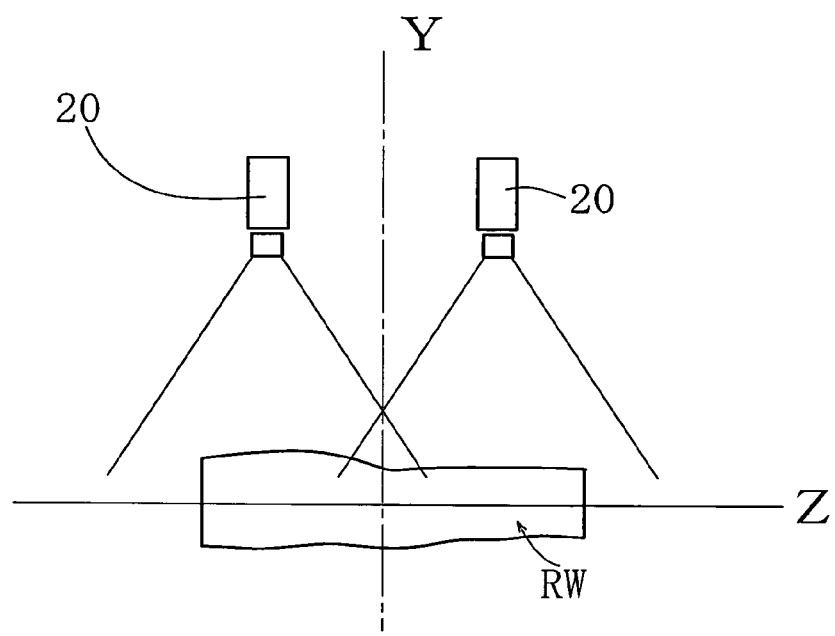
FIG. 13 is a schematic view showing a modified embodiment wherein two cameras are used for photographing a wood block.

According to the present invention, a plurality of cameras may be used instead of the image correction by compensating for the image distortion. FIG. 13 shows a case of using two cameras 20. Two cameras 20 are disposed along a line parallel to the tentative spin axis TS of the block RW so that two different regions of block image are photographed, as shown in FIG. 13, and a complete block image is made by combining a two different regions of image showing different parts of the block image divided longitudinally of the wood block.

Comparing the ratio between horizontal and vertical image dimensions of a block RW with the aspect ratio between the horizontal and vertical image dimensions of the area sensor 22 of the camera 20, that is usually 4:3, the ratio of the horizontal image dimension of the block RW to the vertical dimension thereof is greater than in the case of the aspect ratio of the area sensor 22. Therefore, image distortion in a block image photographed by the single camera 20 located at the center of the block RW, as shown in FIG. 3A, becomes greater toward the opposite ends of the area sensor 22 in z-axis. However, photographing the block RW by two cameras 20 located as shown in FIG. 13, the distortion in the photographed image can be lessened.

Provision of a plurality of cameras 20 along the length of the block RW offers the following advantageous effects. As compared to the ratio of the horizontal image dimension to vertical image dimension in aspect ratio of the area sensor 22 of the camera 20, the ratio of the horizontal image dimension to vertical image dimension of a block RW is greater. Therefore, the effective area on the area sensor 22 where the block RW is imaged is small and unused area on the area sensor 22 is large, as a result of which time is spent for sending unnecessary image data to the computer 30. Additionally, limited number of sensors for the effective area of the area sensor 22 makes the image resolution poor. The use of a plurality of cameras 20 increases the ratio of the effective area of the image photographed by each camera 20, which helps to increase the image resolution. Since the images photographed by plural cameras 20 cover only different parts of the block RW and such images need to be adjusted for generating an image covering the whole block RW, it is desirable that compensation for image distortion should be done using the method described with reference to FIG. 12.

Though two lasers 11, 12 are used in the foregoing embodiments, only one laser may be used. For the illuminated line image LBP1 or LBP2 to be continuous without being influenced by the presence of any irregularities such as knot or burl on the block RW, the block RW should be photographed from a plurality of different positions. To make this possible in an apparatus having only one laser, any suitable mechanism should be provided for moving the single laser between, for example, +θ and −θ positions and the laser should be adapted to project a beam of light against the block RW at these positions. In this case, the block RW is photographed from two different positions either while the block is rotated for two turns or while the block is rotated at a half speed.

Although the invention has been described in detail for the purpose of illustration, it is to be understood that such detail is solely for that purpose and that variations can be made therein by those skilled in the art without departing from the spirit and scope of the invention, except as it may be limited by the claims.

What is claimed is:

1. An apparatus for measuring three dimensional shape of a generally cylindrical wood block comprising:
 a light emitting device for emitting a light beam against the wood block supported rotatably at a tentative spin axis thereof, including a pair of lasers disposed on opposite sides of an imaginary plane passing through a center of a lens of an imaging device and the tentative spin axis in longitudinal direction of the wood block as viewed from one end of the wood block, in such a way that illuminated lines each extending substantially for entire length of the wood block and parallel to the tentative spin axis of the wood block are formed by the light beam at two different positions on the outer peripheral surface of the wood block;
 the imaging device for photographing the wood block with the illuminated lines on the outer peripheral surface thereof at a plurality of angular positions thereof while the wood block is rotated on the tentative spin axis, thereby providing a plurality of photographed block images;
 a position data storage device for storing therein data representing the position of the light emitting device and the imaging device relative to the tentative spin axis of the wood block;
 a line image position computing device for recognizing image of each of the illuminated lines in each of the photographed block images and determining by computation the position of each illuminated line image in the photographed block image at a plurality of spaced points thereof;
 a distance computing device for determining by computation distances between the tentative spin axis of the wood block and each of the illuminated lines on the outer peripheral surface of the wood block at a plurality of cross-sections of the wood block perpendicular to the tentative spin axis, spaced at a predetermined interval along the tentative spin axis and corresponding to said plurality of spaced points, based on data of the line image position determined by the line image position computing device and data of positions stored in the position data storage device;
 a profile computing device for determining by computation profiles of the wood block at said plurality of cross-sections based on data of the distances determined by the distance computing device;
 an image combining device for combining a first image region of a first block image photographed at a first angular position of the wood block and a second image region of a second block image photographed at a second angular position of the wood block where the wood block is rotated from the first angular position for an angle corresponding to twice as big as a predetermined angle, wherein the first image region and the second image region are divided from the each of the photographed block images in half along an imaginary line in the block image that corresponds to the tentative spin axis, and wherein one of the first image region of the first block image and the second image region of the second block image is inverted in line symmetry with respect to said imaginary line.

2. An apparatus according to claim 1, wherein said pair of lasers are disposed symmetrically with respect to said imaginary plane as viewed from one end of the wood block, each of the lasers being spaced at the predetermined angle from said imaginary plane.

3. An apparatus according to claim 1, wherein no part on the outer peripheral surface of the wood block is photographed twice.

4. An apparatus according to claim 1, further comprising an image correction device for correcting the block image photographed by the imaging device by compensating for any distortion of the block image in accordance with a correction value and an image correction data storage for storing therein data of the correction value.

5. An apparatus according to claim 1, wherein said imaging device includes a plurality of imaging devices disposed along a line parallel to the tentative spin axis of the wood block so that a complete block image is made of a plurality of different regions image showing parts of the block image divided longitudinally of the wood block.

6. The appratus according to claim 1, wherein one of the first image region of the first block image and the second image region of the second block image is inverted in line symmetry with respect to said imaginary line and laid on the other of the first image region of the first block image and the second image region of the second block image.

7. A method for measuring three dimensional shape of a generally cylindrical wood block comprising steps of:
 projecting by a light emitting device a light beam against the wood block supported rotatably at a tentative spin axis thereof in such a way that illuminated lines each extending substantially for entire length of the wood block and parallel to the tentative spin axis of the wood block are formed by the light beam at two different positions on the outer peripheral surface of the wood block;
 photographing by an imaging device having a lens the wood block with the illuminated lines on the outer peripheral surface thereof at a plurality of angular positions of the wood block while the wood block is rotated on the tentative spin axis, thereby providing a plurality of photographed block images;
 previously storing data representing the position of the light emitting device and the imaging device relative to the tentative spin axis of the wood block;
 recognizing image of each illuminated line in each of the photographed block images and determining by computation the position of each illuminated line image at a plurality of spaced points thereof;
 determining by computation distances between the tentative spin axis of the wood block and each illuminated line on the outer peripheral surface of the wood block at a plurality of cross-sections of the wood block perpendicular to the tentative spin axis, spaced at a predetermined interval along the tentative spin axis and corresponding to said plurality of spaced points, based on data of said illuminated line image position;
 determining by computation profiles of the wood block at said plurality of cross-sections based on data of said distances;
 said projecting a light beam is done by a pair of lasers disposed symmetrically with respect to an imaginary plane passing through the center of the lens of the imaging device and the tentative spin axis in longitudinal direction of the wood block as viewed from one end of the wood block, each of said lasers being spaced at a predetermined angle from said imaginary plane;
 said photographing is done in such a way that a part on the outer peripheral surface of the wood block photographed by the imaging device at an angular position of the wood block as the illuminated line image due to the illuminated line formed by one laser is photographed by the imaging device again at a different angular position of the wood block as the illuminated line image due to the illuminated line formed by the other laser;

a step of dividing half-and-half each photographed block image into a first image region and a second image region along an imaginary line in the block image that corresponds to the tentative spin axis of the block; and a step of combining the first image region of a first block image photographed at a first angular position of the block and the second image region of a second block image photographed at a second angular position of the wood block where the block is rotated from the first angular position for an angle corresponding to twice as big as a predetermined angle, wherein one of the first image region of the first block image and the second image region of the second block image is inverted in line symmetry with respect to said imaginary line.

8. A method according to claim 7, said projecting a light beam is done by a pair of lasers, and said photographing is done in such a way that no part on the outer peripheral surface of the wood block is photographed by the imaging device twice as the illuminated line image due to the illuminated line formed by one laser and the illuminated line image due to the illuminated line formed by the other laser.

9. A method according to claim 7, further comprising a step of correcting the block image photographed by the imaging device by compensating for any distortion of the block image in accordance with a previously determined correction value.

10. A method according to claim 7, wherein no part on the outer peripheral surface of the wood block is photographed twice.

11. The method according to claim 7, wherein one of the first image region of the first block image and the second image region of the second block image is inverted in line symmetry with respect to said imaginary line and laid on the other of the first image region of the first block image and the second image region of the second block image.

* * * * *